United States Patent
Kang

(10) Patent No.: US 9,185,292 B2
(45) Date of Patent: Nov. 10, 2015

(54) APPARATUS AND METHOD FOR CONTROLLING ACTUATOR IN OPTICAL IMAGE STABILIZER AND OPTICAL IMAGE STABILIZER USING THE SAME

(71) Applicant: SAMSUNG ELECTRO-MECHANICS CO., LTD., Suwon-si (KR)

(72) Inventor: Soon Seok Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/290,706

(22) Filed: May 29, 2014

(65) Prior Publication Data
US 2015/0181122 A1 Jun. 25, 2015

(30) Foreign Application Priority Data
Dec. 19, 2013 (KR) .......................... 10-2013-0159271

(51) Int. Cl.
*G03B 17/00* (2006.01)
*H04N 5/232* (2006.01)
(52) U.S. Cl.
CPC ................................. *H04N 5/23251* (2013.01)
(58) Field of Classification Search
USPC ........................................................ 396/55
See application file for complete search history.

(56) References Cited

U.S. PATENT DOCUMENTS

| 6,097,896 | A  | * | 8/2000 | Usui ................................. 396/55 |
| 2008/0012945 | A1 | * | 1/2008 | Uenaka ....................... 348/208.2 |
| 2008/0195236 | A1 |   | 8/2008 | Koo et al. |
| 2010/0265343 | A1 | * | 10/2010 | Lee et al. ................... 348/208.7 |
| 2012/0026348 | A1 | * | 2/2012 | Yun et al. ................... 348/208.4 |

FOREIGN PATENT DOCUMENTS

| JP | 2010061160 | 3/2010 |
| KR | 10-2008-0015596 A | 2/2008 |
| KR | 10-2008-0074635 A | 8/2008 |

OTHER PUBLICATIONS

Korean Office Action issued on Jul. 14, 2015 for the corresponding Korean Patent Application No. 10-2013-0159271 (English translation pp. 1-7; Korean Office Action pp. 8-12).

* cited by examiner

*Primary Examiner* — Clayton E Laballe
*Assistant Examiner* — Dennis Hancock
(74) *Attorney, Agent, or Firm* — NSIP Law

(57) ABSTRACT

Embodiments of the invention provide an apparatus for controlling an actuator in an optical image stabilizer. The apparatus includes a hand-shake frequency determination unit configured to determine a hand-shake frequency based on distance data output from a distance calculator which is configured to calculate a distance based on an output from a motion sensor. The apparatus further includes a proportional-integral-derivative coefficient selection and switching controller configured to apply proportional-integral-derivative coefficients suitable for the determined hand-shake frequency to a PID controller.

20 Claims, 4 Drawing Sheets

APPARATUS AND METHOD FOR CONTROLLING ACTUATOR IN OPTICAL IMAGE STABILIZER AND OPTICAL IMAGE STABILIZER USING THE SAME

CROSS REFERENCE TO RELATED APPLICATION

This application claims the benefit of and priority under 35 U.S.C. §119 to Korean Patent Application No. KR 10-2013-0159271, entitled "APPARATUS AND METHOD FOR CONTROLLING ACTUATOR IN OPTICAL IMAGE STABILIZER AND OPTICAL IMAGE STABILIZER USING THE SAME," filed on Dec. 19, 2013, which is hereby incorporated by reference in its entirety into this application.

BACKGROUND

1. Field of the Invention

The present invention relates to an apparatus and a method for controlling an actuator in an optical image stabilizer to prevent an image blur from occurring independently of a hand-shake of a low frequency and a hand-shake of a high frequency by optimally controlling the actuator in the optical image stabilizer for both of the hand-shake frequencies.

2. Description of the Related Art

An optical image stabilizer (OIS) senses a user's hand-shake using a motion sensor, for example, a gyro sensor, and prevents an image blur by moving a lens module or an image sensor in an opposite direction to a hand-shake direction by controlling an actuator.

A voice coil motor (VCM) is a frequently used actuator in the OIS for moving the lens module or the image sensor. The VCM has a coil mounted outside a camera lens module to control a direction and an amount of current flowing in the coil and to move the lens module to a desired position.

The major factor to cause the image blur relies on how much light is transferred to RGB pixels of the image sensor. As the camera lens module is shaken, light is transferred to a wider range of pixels, causing the image blur. The OIS moves the position of the lens module or the image sensor to prevent or reduce the image blur.

To prevent the image blur from occurring by moving the lens module, a proportional-integral-derivative (PID) controller is used to control the actuator or VCM. Considering characteristics of the PID controller, it is difficult to accurately control both the low and high hand-shake frequencies.

When the hand-shake of the high frequency is stabilized, a motion value of the hand-shake of the low frequency is excessively over calculated. Because of this, although the lens module does not actually need to move much, the lens module may excessively move. When the PID controller is designed to cope with any one of the low and high hand-shake frequencies, in the case in which the hand-shake frequency is suddenly changed or is in the frequency environment in an opposite direction thereto, excessive occurrences of image blur may be difficult to control.

The performance of the PID controller is changed based on the optimization of ratios of three coefficients, of a proportional coefficient Kp, an integral coefficient Ki, and a differential coefficient Kd, in the given environment. The proportional coefficient Kp has a connection with a current control value, the integral coefficient Ki has a connection with a past control value, and the differential coefficient Kd has a connection with a future control value.

The proportional coefficient Kp has a connection with how large a weight puts on a current error, the integral coefficient Ki has a connection with how many past errors based on the present are integrally controlled, and the differential coefficient Kd has a connection with how to control errors based on a value to some degree and a direction in the future.

One of the values of the three PID coefficients has a close effect on the remaining two coefficient values, and therefore even in the configuration of the PID controller, other PID coefficients may be determined to be optimal values depending on the environment.

Only the three coefficients may be changed in real time by the PID controller. Since the three coefficients may be optimized in the given environment and have various values depending on the purpose, it is difficult to meet all the conditions using one setting value in the OIS. Thus, a trade-off occurs in the performance of the PID controller based on where a frequency domain to be intensively controlled is found.

At the time of driving the OIS, assume the case in which a hand is quickly shaken or slowly shaken. The PID controller sets the Kp, the Ki, and the Kd to prevent a hand from quickly shaking. In this case, when the same Kp, Ki, and Kd are used to prevent the hand-shake of the low frequency, the output from the PID controller is excessively changed in the low frequency domain, such that an oscillation signal may be output from the VCM.

When the excessive oscillation signal is generated from the VCM, the camera lens module oscillates, and thus a captured image is excessively shaken, which is not a preferable phenomenon. To prevent this, since the Kp, the Ki, and the Kd are set to tune a low frequency to correct the hand-shake of the low frequency, when the hand-shake of the high frequency occurs, the hand-shake itself may not be compensated. The reason is that a change in current values moving the lens module is small in the VCM and thus the lens module may not be located immediately at a desired place after the hand-shake phenomenon by slowly moving the lens module.

For example, Japanese reference, JP2010-061160, describes a biasing correction apparatus and a photographing apparatus, which prevent a biasing correcting lens from unstably moving around a moving center at the time of triangular fixing with a small biasing amount by strongly applying a velocity bias using a linear equation velocity bias table when a triangular fixing state is determined by a support state determination unit. In JP2010-061160, it is difficult to optimally control the VCM of the OIS for both the low and high hand-shake frequencies.

SUMMARY

Accordingly, embodiments of the invention have been made in an effort to provide an apparatus for controlling an actuator in an OIS to prevent an image blur from occurring independent of a hand-shake of a low frequency and a hand-shake of a high frequency by optimally controlling the actuator in the OIS for both of the hand-shake frequencies.

Further, embodiments of the invention have been made in an effort to provide a method for controlling an actuator in the OIS to prevent an image blur from occurring independent of a hand-shake of a low frequency and a hand-shake of a high frequency by optimally controlling the actuator in the OIS for both of the hand-shake frequencies.

Additionally, embodiments of the invention have been made in an effort to provide an OIS for preventing an image blur from occurring independent of a hand-shake of a low frequency and a hand-shake of a high frequency by optimally controlling the actuator in the OIS for both of the hand-shake frequencies.

According to various embodiments of the invention, there is provided an apparatus for controlling an actuator in an optical image stabilizer. The apparatus includes a hand-shake frequency determination unit configured to determine a hand-shake frequency based on distance data output from a distance calculator which is configured to calculate a distance based on an output from a motion sensor. The apparatus further includes a PID coefficient selection and switching controller configured to apply PID coefficients suitable for the determined hand-shake frequency to a PID controller.

According to an embodiment, the actuator of this apparatus includes a VCM.

According to an embodiment, the apparatus further includes a PID coefficient storage configured to store the PID coefficients suitable for the hand-shake frequency.

According to an embodiment, the PID coefficient selection and switching controller is further configured to determine whether the hand-shake frequency is equal to or less than a reference value based on an output from the hand-shake frequency determination unit. According to at least one embodiment, if it is determined that the hand-shake frequency is equal to or less than the reference value, the controller is further configured to apply the PID coefficients for low frequency to the PID controller. According to at least one embodiment, if it is determined that the hand-shake frequency is larger than the reference value, the controller is further configured to apply the PID coefficients for high frequency to the PID controller.

According to an embodiment, the hand-shake frequency determination unit includes a moving average filter configured to perform moving average filtering on the distance data which are output from the distance calculator, and a first order differentiator configured to differentiate an output from the moving average filter. The hand-shake frequency determination unit further includes a second order differentiator configured to differentiate the output from the moving average filter, and a period generator configured to generate a predetermined period. Furthermore, the hand-shake frequency determination unit includes an inter-vertex distance calculator configured to calculate a distance between vertexes based on an output from the first order differentiator and a period generated from the period generator, and an inter-inflection point distance calculator configured to calculate a distance between inflection points based on an output from the second order differentiator and a period generated from the period generator. The hand-shake frequency determination unit further includes a frequency determination unit configured to determine a hand-shake frequency based on outputs from the inter-vertex distance calculator, the inter-inflection point distance calculator, and the period generator.

According to an embodiment, the PID coefficient selection and switching controller is further configured to apply the PID coefficients suitable for the hand-shake frequency to the PID controller based on the output from the hand-shake frequency determination unit after a progressing one PID control is completed.

According to an embodiment, the optical image stabilizer includes an optical image stabilizer included in a mobile device, and wherein the motion sensor includes a gyro sensor included in the optical image stabilizer.

According to another embodiment of the invention, there is provided a method for controlling an actuator in an optical image stabilizer. The method includes determining a hand-shake frequency based on distance data output from a distance calculator, which calculates a distance based on an output from a motion sensor, and applying PID coefficients suitable for the determined hand-shake frequency to a PID controller.

According to an embodiment, the actuator used in this method includes a VCM.

According to an embodiment, the step of applying the PID coefficients includes acquiring the PID coefficients suitable for the determined hand-shake frequency from a PID coefficient storage storing the PID coefficients, and applying the acquired PID coefficients to the PID controller.

According to an embodiment, the step of applying the PID coefficients to the PID controller includes determining whether the determined hand-shake frequency is equal to or less than a reference value. According to at least one embodiment, if it is determined that the hand-shake frequency is equal to or less than the reference value, the method further includes applying the PID coefficients for low frequency to the PID controller. According to at least one embodiment, if it is determined that the hand-shake frequency is larger than the reference value, the method further includes applying the PID coefficients for high frequency to the PID controller.

According to an embodiment, the step of determining the hand-shake frequency includes performing moving average filtering on distance data output from the distance calculator, differentiating a signal, which is subjected to the moving average filtering, and, after differentiating the signal, which is subjected to the moving average filtering, differentiating the differentiated signal, which is subjected to the moving average filtering. The method further includes generating a predetermined period, calculating a distance between vertexes based on the differentiated signal, which is subjected to the moving average filtering, and the generated period. Further, the method includes calculating a distance between inflection points based on the subsequent differentiated signal, which is subjected to the moving average, and the generated period; and determining the hand-shake frequency based on the calculated distance between the vertexes, the calculated distance between the inflection points, and the generated period.

According to an embodiment, the step of applying the PID coefficients to the PID controller includes applying the PID coefficients suitable for the determined hand-shake frequency to the PID controller after a progressing one PID control is completed.

According to an embodiment, the optical image stabilizer includes an optical image stabilizer included in a mobile device, and the motion sensor includes a gyro sensor included in the optical image stabilizer.

According to another embodiment of the invention, there is provided an optical image stabilizer, including a motion sensor configured to sense a hand-shake, an actuator configured to move an image sensor or a lens of a camera module to an opposite direction to a hand-shake direction in response to the hand-shake, and a hall sensor configured to sense an actual moving distance of the actuator. The optical image stabilizer further includes a distance calculator configured to calculate a moving distance due to the hand-shake based on an output from the motion sensor, a PID controller configured to output an actuator control signal based on a difference between a distance output from the distance calculator and the actual moving distance of the actuator output from the hall sensor, and an actuator driver configured to output a signal for operating the actuator based on the output from the PID controller. The optical image stabilizer further includes a hand-shake frequency determination unit configured to determine a hand-shake frequency based on distance data output from the distance calculator, and a PID coefficient selection and switching controller configured to apply the PID coefficients suitable for the determined hand-shake frequency to the PID controller.

According to an embodiment, the actuator of the optical image stabilizer includes a VCM.

According to an embodiment, the optical image stabilizer further includes a PID coefficient storage configured to store the PID coefficients suitable for the hand-shake frequency.

According to an embodiment, the PID coefficient selection and switching controller is configured to determine whether the hand-shake frequency is equal to or less than a reference value based on an output from the hand-shake frequency determination unit. According to an embodiment, if it is determined that the hand-shake frequency is equal to or less than the reference value, the PID coefficient selection and switching controller is configured to apply the PID coefficients for low frequency to the PID controller. According to an embodiment, if it is determined that the hand-shake frequency is larger than the reference value, the PID coefficient selection and switching controller is configured to apply the PID coefficients for high frequency to the PID controller.

According to an embodiment, the hand-shake frequency determination unit includes a moving average filter configured to perform moving average filtering on the distance data, which are output from the distance calculator, a first order differentiator configured to differentiate an output from the moving average filter, and a second order differentiator configured to differentiate the output from the moving average filter. The hand-shake frequency determination unit further includes a period generator configured to generate a predetermined period, an inter-vertex distance calculator configured to calculate a distance between vertexes based on an output from the first order differentiator and a period generated from the period generator, and an inter-inflection point distance calculator configured to calculate a distance between inflection points based on an output from the second order differentiator and a period generated from the period generator. Further, the hand-shake frequency determination unit includes a frequency determination unit configured to determine a hand-shake frequency based on outputs from the inter-vertex distance calculator, the inter-inflection point distance calculator, and the period generator.

According to an embodiment, the PID coefficient selection and switching controller is further configured to apply the PID coefficients suitable for the hand-shake frequency to the PID controller based on the output from the hand-shake frequency determination unit after a progressing one PID control is completed.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
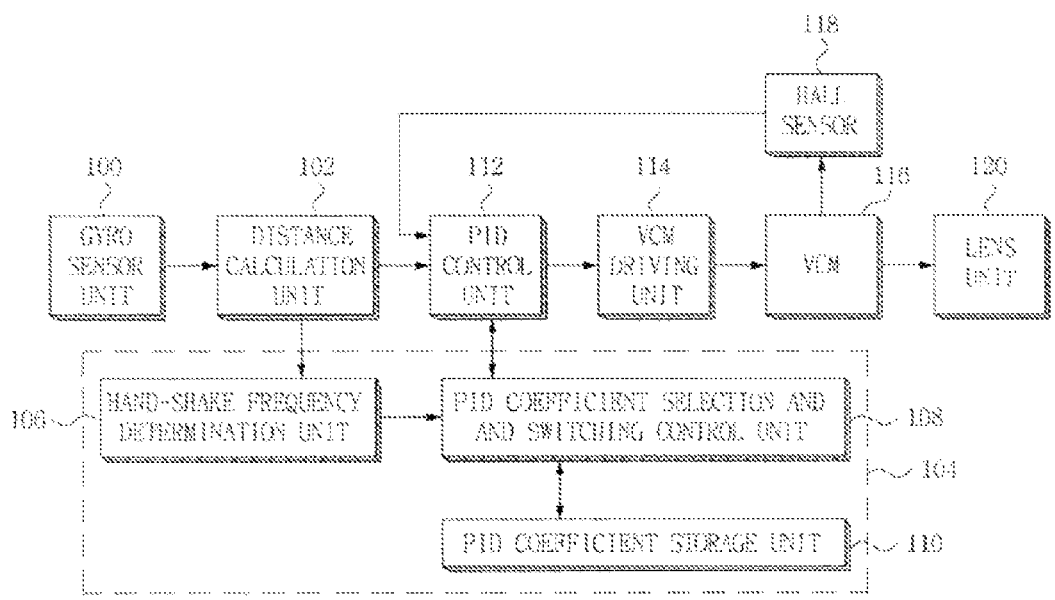
FIG. 1 is a block diagram illustrating an OIS including an apparatus for controlling an actuator in the OIS according to an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Figure 2:
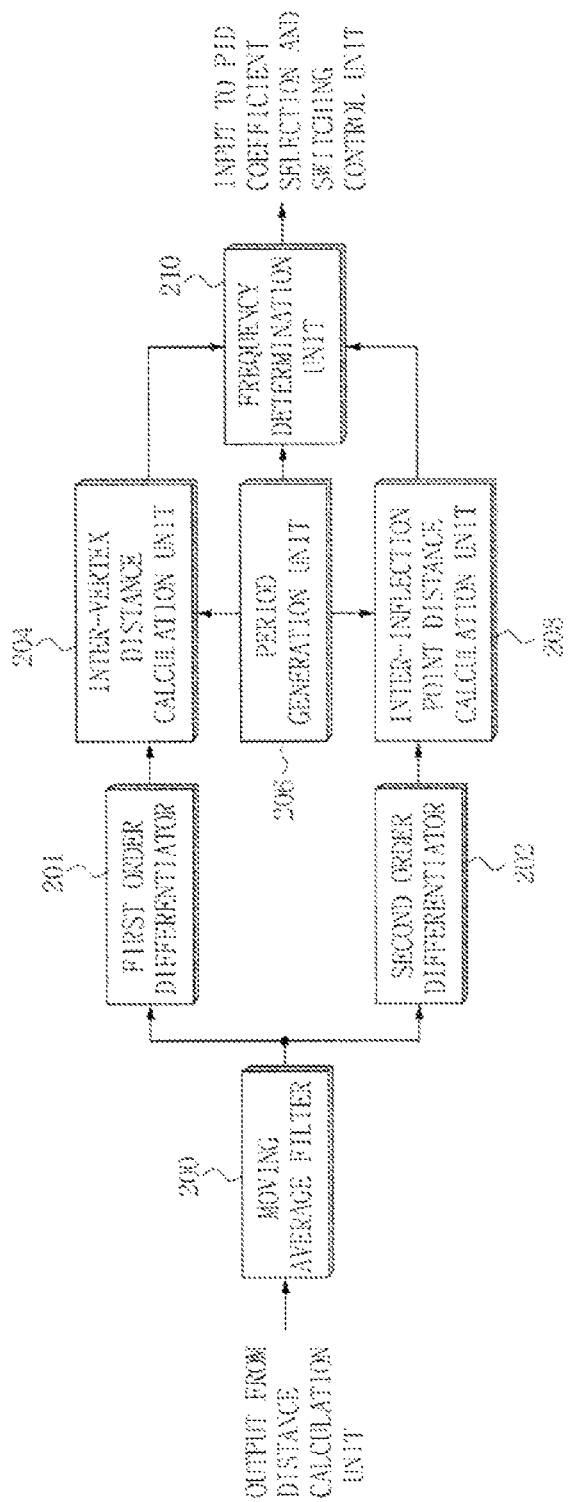
FIG. 2 is a detailed block diagram of a hand-shake frequency determination unit illustrated in FIG. 1, according to an embodiment of the invention.

FIG. 1 is a block diagram illustrating an OIS including an apparatus for controlling an actuator in the OIS according to an embodiment of the invention, and FIG. 2 is a detailed block diagram of a hand-shake frequency determination unit illustrated in FIG. 1, according to an embodiment of the invention.

An apparatus for controlling an actuator in an OIS according to an embodiment of the invention will be described with reference to FIGS. 1 and 2 below.

According to various embodiments of the invention, there is provided an apparatus for controlling a VCM in an OIS optimized for a current hand-shake state independent of hand-shake frequencies by making criteria to determine a low frequency domain and a high frequency domain for hand-shake in advance and making sets of PID coefficients, each optimized for a hand-shake of a low frequency and a hand-shake of a high frequency, when the hand-shake occurs during the driving of the OIS to prevent a malfunction of the VCM, which is, for example, the actuator in the OIS.

Embodiments of the invention describe controlling the VCM as the actuator in the OIS, but the apparatus for controlling an actuator in an OIS according to the embodiments of the invention are not limited thereto, but may also control any type of actuator in the OIS.

As described above, it is difficult to optimally control the VCM in the OIS for both the low and high hand-shake frequencies using one set of PID coefficients. Therefore, various embodiments of the invention improve this situation to minimize a position error, which occurs in the entire OIS.

According to an embodiment, an optical image stabilizer including an apparatus 104 for controlling an actuator in an OIS, as illustrated in FIG. 1, includes a gyro sensor 100, which senses hand shaking, a VCM 116, which is an actuator to move a lens 120 of a camera module (not illustrated) in an opposite direction to the hand-shake direction in response to the hand shaking, a hall sensor 118, which senses an actual moving distance of the VCM 116, a distance calculator 102, which calculates the moving distance due to the hand shaking based on an output from the gyro sensor 100, a PID controller 112, which outputs a voice coil motor control signal based on a difference between a distance output from the distance calculator 102 and the actual moving distance of the VCM 116 output from the hall sensor 118, a VCM driver 114, which outputs a signal to operate the VCM 116 based on the output from the PID controller 112, and an apparatus 104 for controlling an actuator.

The apparatus 104 for controlling the actuator includes a hand-shake frequency determination unit 106, which determines a hand-shake frequency based on distance data output from the distance calculator 102, a PID coefficient selection and switching controller 108, which applies PID coefficients suitable for the determined hand-shake frequency to the PID controller 112, and a PID coefficient storage 110, which stores the PID coefficients suitable for the hand-shake frequency.

As further shown in FIG. 1, the output from the gyro sensor 110 is represented by an angular velocity. When the output passes through a low pass filter in consideration of, for example, a cut off, a phase, a magnitude, and angle information of which the ripple and the drift are attenuated is obtained, and thus a distance that the lens has to move is calculated.

The distance calculator 102 calculates the distance that the lens has to move due to the hand shaking, based on the output from the gyro sensor 100.

$$d = F \times \tan(a) \quad [\text{Equation 1}]$$

In the above Equation 1, d represents the moving distance of the lens, F represents a focal distance of the lens, and a represents the calculated angle.

An operation of the apparatus 104 for controlling an actuator in the OIS, according to another embodiment of the invention, configured as described above will be described below in more detail.

According to an embodiment, the hand-shake frequency determination unit 106 determines the hand-shake frequency based on the distance data output from the distance calculator 102, which calculates a distance based on the output from the gyro sensor 100.

An operation of the hand-shake frequency determination unit 106 will be described below in detail with reference to the detailed block diagram of the hand-shake frequency determination unit 106 illustrated in FIG. 2.

According to an embodiment, the hand-shake frequency determination unit 106, as illustrated in FIG. 2, includes a moving average filter 200, which performs moving average filtering on the distance data output from the distance calculator 102, a first order differentiator 201, which primarily differentiates the output from the moving average filter 200, a second order differentiator 202, which secondarily differentiates the output from the moving average filter 200, a period generator 206, which generates a predetermined period, an inter-vertex distance calculator 204, which calculates a distance between vertexes based on an output from the first order differentiator 201 and a period generated from the period generator 206, an inter-inflection point distance calculator 208, which calculates a distance between the inflection points based on an output from the second order differentiator 202 and the period generated from the period generator 206, and a frequency determination unit 210, which determines the hand-shake frequency based on the outputs from the inter-vertex distance calculator 204, the inter-inflection point distance calculator 208, and the period generator 206.

As further shown in FIG. 2, the hand-shake frequency determination unit 106 determines how much the hand shaking is sensed in the current OIS. The first order differentiator 201 primarily differentiates the signal output from the moving average filter 200 to extract the vertex and the inter-vertex distance calculator 204 calculates the inter-vertex distance based on the output from the first order differentiator 201 and the output from the period generator 206.

According to an embodiment, the second order differentiator 202 secondarily differentiates the signal output from the moving average filter 200 to extract the inflection point and the inter-vertex distance calculator 208 calculates the inter-inflection point distance based on the output from the second order differentiator 202 and the output from the period generator 206.

According to an embodiment, the frequency determination unit 210 determines the hand-shake frequency based on the outputs from the inter-vertex distance calculator 204, the inter-inflection point distance calculator 208, and the period generator 206, and outputs the determined hand-shake frequency to the PID coefficient selection and switching controller 108.

The frequency determination unit 210 determines how many a maximum value and a minimum value are present in the period generated from the period generator 206 to determine the hand-shake frequency. In this case, the inflection point is extracted by an auxiliary determination mechanism and only a partial maximum value and a partial minimum value of a specific time or more are determined as data of the extraction of the hand-shake frequency.

When the distance data output from the distance calculator 102 are flexibly changed using the moving average filter 200, the changed data move having predetermined directivity. That is, the data output from the moving average filter 200 have a nature that if the data value is "+", the data value moves to "+" and if the data value is "−", the data value moves to "−". According to at least one embodiment, the first order differentiation and the second order differentiation are applied to the data, to calculate the periods of the vertex and the inflection point.

According to an embodiment, the PID coefficient selection and switching controller 108 compares the hand-shake frequency output from the hand-shake frequency determination unit 106 with, for example 3 Hz which is a reference frequency to determine whether the hand-shake frequency is the low frequency, and if it is determined that the hand-shake frequency is equal to or less 3 Hz, which is the reference frequency, a determination of whether the hand-shake frequency as the low frequency to acquire the PID coefficients for low frequency from the PID coefficient storage 110 and provide the acquired PID coefficients to the PID controller 112, such that the PID controller 112 is operated depending on the PID coefficients for low frequency.

If it is determined that the hand-shake frequency is larger than 3 Hz, which is the reference frequency, the PID coefficient selection and switching controller 108 acquires the PID coefficients for high frequency from the PID coefficient storage 110 and provides the acquired PID coefficients to the PID controller 112, such that the PID controller 112 is operated depending on the PID coefficients for high frequency.

According to an embodiment, the PID coefficient storage 110 is separately stored with PID coefficients Kp, Ki, and Kd as two sets of the PID coefficients for low frequency and the PID coefficients for high frequency. The PID coefficients for low frequency and the PID coefficients for high frequency are values, which are determined by referring to simulation results and experimental results.

Under the hand-shake situations of various frequency domains, various PID coefficients are applied to the frequency PID controller 112 to determine the PID coefficients of the case in which the hand-shake correcting performance is optimal in the predetermined frequency domain as the PID coefficients suitable for the corresponding frequency domain. For example, under the situation in which the hand shake of the low frequency of 3 Hz or less occurs, various PID coefficients are applied to the PID controller 112 to determine the PID coefficients Kp, Ki, and Kd of the case in which oscillation does not occur and the hand-shake correction performance is maximum as the PID coefficients for low frequency.

Further, under the situation in which the hand shaking of the high frequency larger than 3 Hz occurs, various PID coefficients are applied to the PID controller 112 to determine the PID coefficients Kp, Ki, and Kd of the case in which the VCM is normally operated and the hand-shake correction performance is maximum as the PID coefficients for high frequency.

According to an embodiment, the PID coefficients are not divided into the low frequency and the high frequency and the hand-shake frequency domain is more sub-divided, and thus the PID coefficients suitable for each of the plurality of frequency domains are determined and then are also stored in the PID coefficient storage 110. In this case, the PID coefficient selection and switching controller 108 compares the input hand-shake frequency with a plurality of reference frequencies to acquire the PID coefficients Kp, Ki, and Kd of a domain corresponding to the hand-shake frequency from the PID coefficient storage 110 and provide the acquired PID coefficients to the PID controller 112.

The plurality of PID coefficients Kp, Ki, and Kd stored in the PID coefficient storage 110 are values optimized for each of the frequency domains and are updated as needed.

Further, when the PID coefficient selection and switching controller 108 applies the PID coefficients suitable for the hand-shake frequency to the PID controller 112 to control the PID controller 112 using the PID coefficients suitable for the hand-shake frequency, the PID coefficient selection and switching controller 108 does not change the PID coefficients of the PID controller 112 at the moment that a frequency mode, that is, a low frequency mode or a high frequency mode is determined.

According to an embodiment, the reason is that only when the progressed PID control completely ends and then the PID coefficients are applied, the PID control is correctly performed. Therefore, the PID coefficient selection and switching controller 108 needs to determine to what extent the current PID control is progressed and at what timing the PID coefficients are changed.

According to an embodiment, the PID control in the OIS is performed at several tens of KHz, and when the actual control time is not long and therefore one PID controls is finished, an interrupt occurs and thus the PID coefficients of the PID controller 112 are changed.

Figure 3:
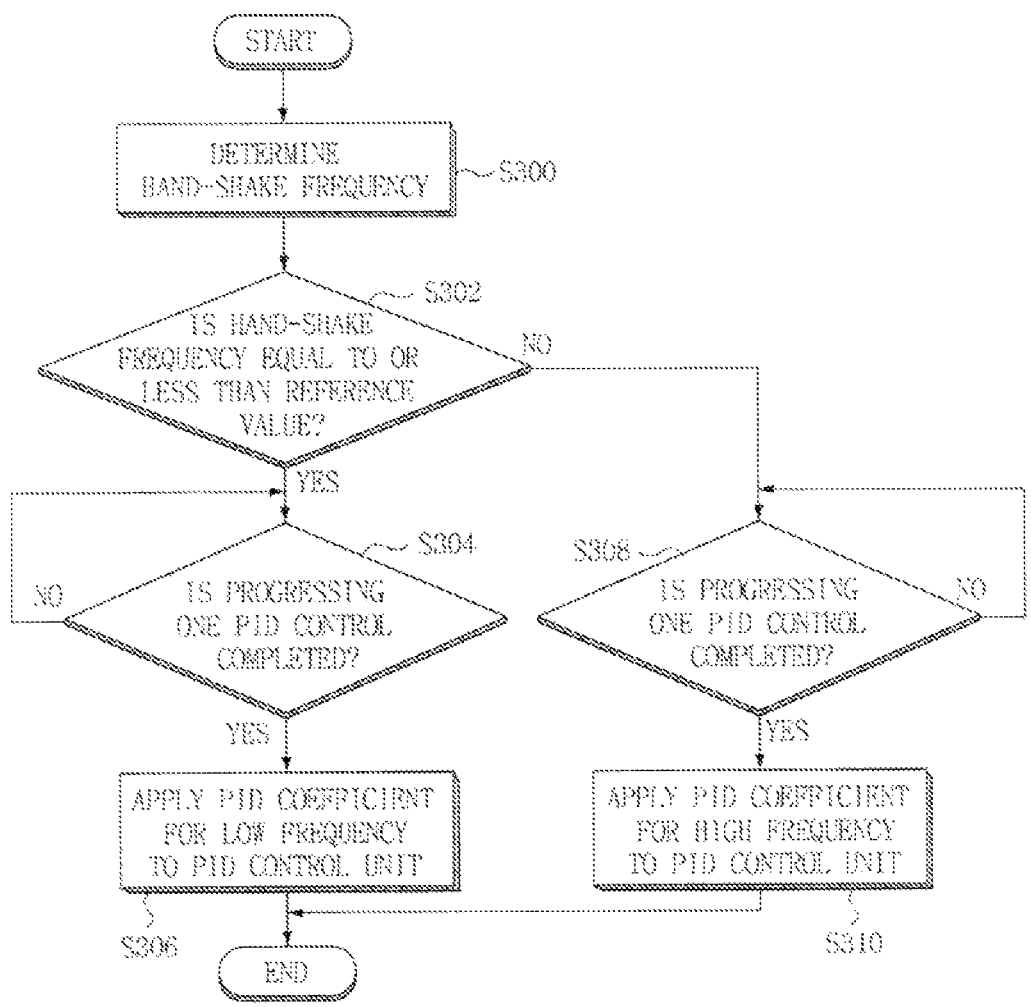
FIG. 3 is a flow chart illustrating a method for controlling an actuator in the OIS according to an embodiment of the invention.
Figure 4:
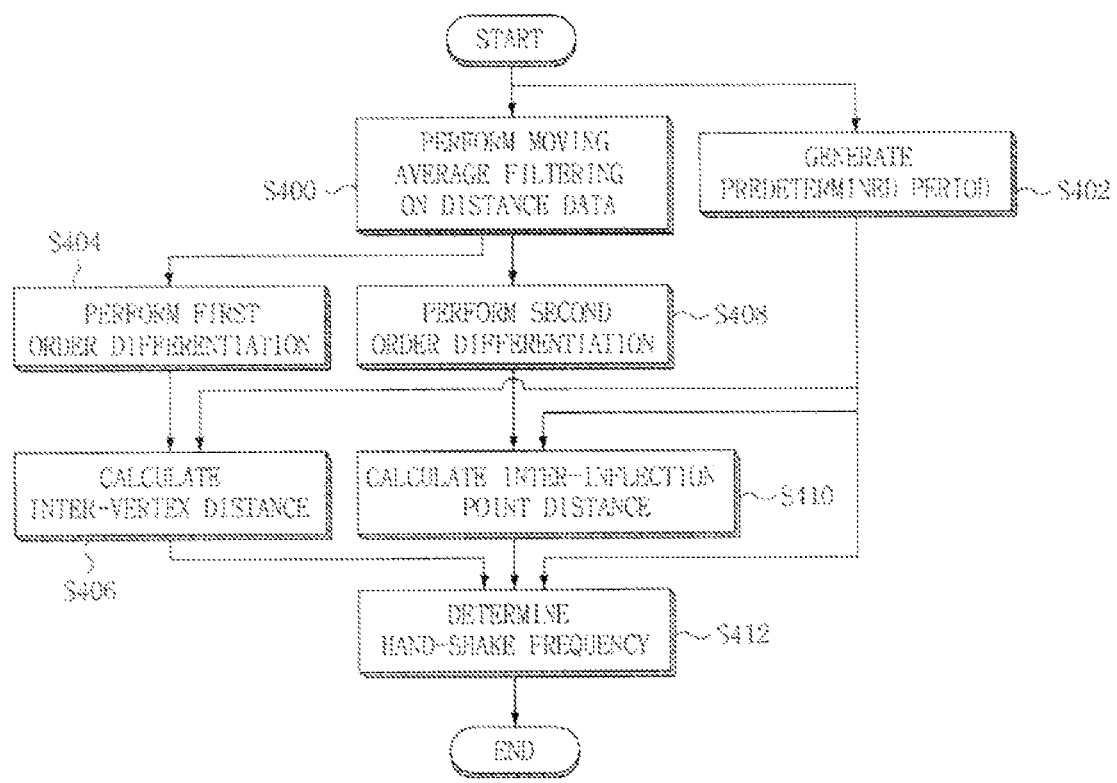
FIG. 4 is a detailed flow chart illustrating a process of determining a hand-shake frequency illustrated in FIG. 3 according to an embodiment of the invention.

FIG. 3 is a flow chart illustrating a method for controlling an actuator in the OIS according to an embodiment of the invention, and FIG. 4 is a detailed flow chart illustrating a process of determining a hand-shake frequency illustrated in FIG. 3 according to an embodiment of the invention.

Hereinafter, a method for controlling an actuator in an optical image stabilizer (OIS) according to a preferred embodiment of the present invention will be described with reference to FIGS. 3 and 4.

In step S300, the hand-shake frequency determination unit 106 determines the hand-shake frequency based on the distance data output from the distance calculator 102.

A process of determining the hand-shake frequency in step S300 will be described in detail with reference to FIG. 4.

In step S400, the moving average filter 200 performs the moving average filtering on the distance data output from the distance calculator 102. In step S402, the period generator 206 generates a predetermined period. In step S404, the first order differentiator 201 primarily differentiates the distance data which are subjected to the moving average filtering to extract the vertex. In step S406, the inter-vertex distance calculator 204 calculates the distance between the vertexes based on the extracted vertex and the generated predetermined period.

In step S408, the second order differentiator 202 secondarily differentiates the distance data which are subjected to the moving average filtering to extract the inflection point. In step S410, the inter-inflection point distance calculator 208 calculates the distance between the inflection points based on the extracted inflection point and the generated predetermined period.

In step S412, the frequency determination unit 210 determines the hand-shake frequency based on the distance between the vertexes, the distance between the inflection points, and the predetermined period.

Referring back to FIG. 3, in step S302, the PID coefficient selection and switching controller 108 determines whether the hand-shake frequency output from the hand-shake frequency determination unit 106 is equal to or less 3 Hz which is a predetermined reference value.

According to an embodiment, when the hand-shake frequency is equal or less than 3 Hz which is a reference value, in step 304, the PID coefficient selection and switching controller 108 monitors the state of the PID controller 112 to determine whether the progressing one PID control is completed.

When the progressing one PID control is completed, in step S306, the PID coefficient selection and switching controller 108 acquires the PID coefficients for low frequency from the PID coefficient storage 110 and apply the acquired PID coefficients to the PID controller 112. The PID controller 112 is operated depending on the PID coefficients for low frequency.

According to an embodiment, when the hand-shake frequency is not equal to or less than the reference value, in step 308, the PID coefficient selection and switching controller 108 monitors the state of the PID controller 112 to determine whether the progressing one PID control is completed.

According to an embodiment, when the progressing one PID control is completed, in step S310, the PID coefficient selection and switching controller 108 acquires the PID coefficients for high frequency from the PID coefficient storage 110 and applies the acquired PID coefficients to the PID controller 112. The PID controller 112 is operated depending on the PID coefficients for high frequency.

Therefore, the PID controller 112 performs the PID control based on the PID coefficients Kp, Ki, and Kd suitable for the hand-shake frequency. That is, when the hand-shake frequency is the low frequency, the PID controller 112 performs the PID control based on the PID coefficients for low frequency and when the hand-shake frequency is the high frequency, the PID controller 112 performs the PID control based on the PID coefficients for high frequency.

In some cases, the PID coefficients are not divided into the low frequency and the high frequency and the hand-shake frequency domain is more sub-divided and thus the PID coefficients suitable for each of the plurality of frequency domains are determined and then are also stored in the PID coefficient storage 110. In this case, the PID coefficient selection and switching controller 108 compares the input hand-shake frequency with a plurality of reference frequencies to acquire the PID coefficients Kp, Ki, and Kd of a region corresponding to the hand-shake frequency from the PID coefficient storage 110 and provide the acquired PID coefficients to the PID controller 112.

According to the conventional art, the PID control is performed using the same PID coefficients Kp, Ki, and Kd for the hand shaking in the low frequency domain and the high frequency domain. Therefore, the noise related trade-off is always present in the VCM control. According to an embodiment of the invention, the current hand-shake state is accurately determined based on the output from the gyro sensor 100 to calculate the current hand-shake frequency and the PID coefficients are changed to tune the calculated hand-shake frequency to perform the optimal PID control on both of the hand shake of the low frequency and the hand-shake of the high frequency, thereby optimally controlling the VCM.

Therefore, according to an embodiment of the invention, an average residual error occurring in the VCM can be reduced and the PID is controlled based on the sensed hand-shake frequency to be able minimize the difference between the actual position and the current position of the lens module which moves by the VCM.

Further, the lens module quickly moves to the designated position at the time of the occurrence of the hand-shake of the high frequency and slowly moves to the designated position at the time of the occurrence of the hand shake of the low frequency, thereby minimizing the noise of the entire image. However, according to the conventional art, the minimum duty is defined and thus the lens module moves as much as the minimum duty independent of the frequency, such that the change in VCM may be larger than the change in frequency. According to an embodiment of the invention, the duty range of the low frequency and the high frequency may be changed to meet the hand-shake state and therefore the VCM can be precisely controlled.

Further, according to an embodiment of the invention, the stabilization of the image can be implemented. When the oscillation signal is output from the VCM in the low frequency domain, the image acquired by the image sensor is swayed in response to the fluctuation of the lens module. Since the PID control for high frequency is performed at the time of the occurrence of the hand shake of the low frequency, the image is not stabilized based on the central point and can be repeated at a +/− position, such that the shaking of the image essentially occurs. According to an embodiment of the invention, since the PID coefficients for low frequency is used in the PID control at the time of the occurrence of the hand-shake of the low frequency, the oscillation signal is not output from the VCM and thus the oscillation of the lens module is prevented, thereby acquiring the clear image without blur.

According to an embodiment of the invention, it is possible to prevent the image blur from occurring independent of the of the low and high hand-shake frequencies by optimally controlling the actuator in the OIS for both of the hand-shake frequencies.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. An apparatus for controlling an actuator in an optical image stabilizer (OIS), the apparatus comprising:
   a hand-shake frequency determination unit configured to extract vertexes based on distance data output from a distance calculator which is configured to calculate a distance based on an output from a motion sensor and determine a hand-shake frequency based on the number of vertexes in a predetermined period; and a proportional-integral-derivative (PID) coefficient selection and switching controller configured to apply PID coefficients suitable for the determined hand-shake frequency to a PID controller.

2. The apparatus according to claim 1, wherein the actuator comprises a voice coil motor (VCM).

3. The apparatus according to claim 1, further comprising:
a PID coefficient storage configured to store the PID coefficients suitable for the hand-shake frequency.

4. The apparatus according to claim 1, wherein the PID coefficient selection and switching controller is further configured to determine whether the hand-shake frequency is equal to or less than a reference value based on output from the hand-shake frequency determination unit,
wherein, if it is determined that the hand-shake frequency is equal to or less than the reference value, the controller is further configured to apply the PID coefficients for low frequency to the PID controller, and
wherein, if it is determined that the hand-shake frequency is larger than the reference value, the controller is further configured to apply the PID coefficients for high frequency to the PID controller.

5. The apparatus according to claim 1, wherein the hand-shake frequency determination unit comprises:
a moving average filter configured to perform moving average filtering on the distance data which are output from the distance calculator;
a first order differentiator configured to differentiate an output from the moving average filter to extract the vertexes;
a second order differentiator configured to differentiate the output from the moving average filter to extract inflection points;
a period generator configured to generate the predetermined period;
an inter-vertex distance calculator configured to calculate a distance between vertexes based on from the vertexes extracted by the first order differentiator and a period generated from the period generator;
an inter-inflection point distance calculator configured to calculate a distance between inflection points based on the inflection points extracted by the second order differentiator and the predetermined period generated from the period generator; and
a frequency determination unit configured to determine the hand-shake frequency by calculating the number of vertexes which are present in the predetermined period based on the inter-vertex distance calculated by the inter-vertex distance calculation unit, the inter-inflection point distance calculated by the inter-inflection point distance calculation unit, and the predetermined period generated by the period generation unit.

6. The apparatus according to claim 1, wherein the PID coefficient selection and switching controller is further configured to apply the PID coefficients suitable for the hand-shake frequency to the PID controller based on the output from the hand-shake frequency determination unit after a progressing one PID control is completed.

7. The apparatus according to claim 1, wherein the OIS comprises an optical image stabilizer included in a mobile device, and wherein the motion sensor comprises a gyro sensor included in the optical image stabilizer.

8. A method for controlling an actuator in an OIS, the method comprising:

extracting vertexes based on distance data output from a distance calculator, which calculates a distance based on an output from a motion sensor and determining a hand-shake frequency based on the number of vertexes in a predetermined period; and
applying PID coefficients suitable for the determined hand-shake frequency to a PID controller.

9. The method according to claim 8, wherein the actuator comprises a VCM.

10. The method according to claim 8, wherein the step of applying the PID coefficients comprises acquiring the PID coefficients suitable for the determined hand-shake frequency from a PID coefficient storage storing the PID coefficients, and applying the acquired PID coefficients to the PID controller.

11. The method according to claim 8, wherein the step of applying the PID coefficients to the PID controller comprises:
determining whether the determined hand-shake frequency is equal to or less than a reference value,
wherein, if it is determined that the hand-shake frequency is equal to or less than the reference value, applying the PID coefficients for low frequency to the PID controller, and
wherein, if it is determined that the hand-shake frequency is larger than the reference value, applying the PID coefficients for high frequency to the PID controller.

12. The method according to claim 8, wherein the step of determining the hand-shake frequency comprises:
performing moving average filtering on distance data output from the distance calculator;
extracting the vertexes by differentiating a signal, which is subjected to the moving average filtering;
after differentiating the signal, which is subjected to the moving average filtering, extracting inflection points by differentiating the differentiated signal, which is subjected to the moving average filtering;
generating the predetermined period;
calculating a distance between vertexes based on the extracted vertexes and the generated period;
calculating a distance between inflection points based on the extracted inflection point and the generated period; and
determining the hand-shake frequency by calculating the number of vertexes which are present in the predetermined period based on the calculated distance between the vertexes, the calculated distance between the inflection points, and the generated period.

13. The method according to claim 8, wherein the step of applying the PID coefficients to the PID controller comprises:
applying the PID coefficients suitable for the determined hand-shake frequency to the PID controller after a progressing one PID control is completed.

14. The method according to claim 8, wherein the OIS comprises an OIS included in a mobile device, and the motion sensor comprises a gyro sensor included in the OIS.

15. An OIS, comprising:
a motion sensor configured to sense a hand-shake;
an actuator configured to move an image sensor or a lens of a camera module to an opposite direction to a hand-shake direction in response to the hand-shake;
a hall sensor configured to sense an actual moving distance of the actuator;
a distance calculator configured to calculate a moving distance due to the hand-shake based on an output from the motion sensor;
a PID controller configured to output an actuator control signal based on a difference between a distance output from the distance calculator and the actual moving distance of the actuator output from the hall sensor;

an actuator driver configured to output a signal for operating the actuator based on the output from the PID controller;

a hand-shake frequency determination unit configured to extract vertexes based on distance data output from the distance calculator and determine the hand-shake frequency based on the number of vertexes in a predetermined period; and a PID coefficient selection and switching controller configured to apply the PID coefficients suitable for the determined hand-shake frequency to the PID controller.

16. The OIS according to claim 15, wherein the actuator comprises a VCM.

17. The OIS according to claim 15, further comprising:
a PID coefficient storage configured to store the PID coefficients suitable for the hand-shake frequency.

18. The OIS according to claim 15, wherein the PID coefficient selection and switching controller is configured to determine whether the hand-shake frequency is equal to or less than a reference value based on an output from the hand-shake frequency determination unit, wherein, if it is determined that the hand-shake frequency is equal to or less than the reference value, the PID coefficient selection and switching controller is configured to apply the PID coefficients for low frequency to the PID controller, and wherein, if it is determined that the hand-shake frequency is larger than the reference value, the PID coefficient selection and switching controller is configured to apply the PID coefficients for high frequency to the PID controller.

19. The OIS according to claim 15, wherein the hand-shake frequency determination unit comprises:

a moving average filter configured to perform moving average filtering on the distance data, which are output from the distance calculator;

a first order differentiator configured to differentiate an output from the moving average filter to extract the vertexes;

a second order differentiator configured to differentiate the output from the moving average filter to extract inflection points;

a period generator generating the predetermined period;

an inter-vertex distance calculator configured to calculate a distance between vertexes based on from the vertexes extracted by the first order differentiator and the period generated from the period generator;

an inter-inflection point distance calculator configured to calculate a distance between inflection points based on from the inflection points extracted by the second order differentiator and the period generated from the period generator; and a frequency determination unit configured to determine a hand-shake frequency by calculating the number of vertexes which are present in the predetermined period based on the inter-vertex distance calculated by the inter-vertex distance calculation unit, the inter-inflection point distance calculated by the inter-inflection point distance calculation unit, and the predetermined period generated by the period generation unit.

20. The OIS according to claim 15, wherein the PID coefficient selection and switching controller is further configured to apply the PID coefficients suitable for the hand-shake frequency to the PID controller based on the output from the hand-shake frequency determination unit after a progressing one PID control is completed.

* * * * *